US007999676B2

(12) United States Patent
Cheung et al.

(10) Patent No.: US 7,999,676 B2
(45) Date of Patent: Aug. 16, 2011

(54) METHOD AND SYSTEM FOR DETERMINING THE PLACEMENT OF RFID ANTENNAS TO OBTAIN A READABLE REGION FOR RFID TAGS

(75) Inventors: Shing Chi Cheung, Chai Wan (HK); Lionel Ming Shuan Ni, Clear Water Bay (HK)

(73) Assignee: The Hong Kong University of Science and Technology, Kowloon (HK)

( * ) Notice: Subject to any disclaimer, the term of this patent is extended or adjusted under 35 U.S.C. 154(b) by 417 days.

(21) Appl. No.: 12/140,313

(22) Filed: Jun. 17, 2008

(65) Prior Publication Data
US 2009/0015409 A1 Jan. 15, 2009

Related U.S. Application Data

(60) Provisional application No. 60/936,293, filed on Jun. 20, 2007.

(51) Int. Cl.
*G08B 13/14* (2006.01)
(52) U.S. Cl. ............... 340/572.1; 340/572.4; 340/572.8; 340/539.13; 340/10.4; 235/382; 235/385; 235/432; 235/375; 235/451; 235/492; 343/757; 343/766
(58) Field of Classification Search ............... 340/572.1, 340/572.4, 572.8, 539.13, 10.4; 235/382, 235/385, 432, 375, 451, 492; 343/652, 664, 343/757, 766
See application file for complete search history.

(56) References Cited

U.S. PATENT DOCUMENTS

| | | | |
|---|---|---|---|
| 4,578,139 A * | 3/1986 | Stehouwer | .................... 156/384 |
| 5,473,335 A | 12/1995 | Tines | |
| 5,787,673 A | 8/1998 | Noble | |
| 7,161,489 B2 | 1/2007 | Sullivan et al. | |
| 7,221,269 B2 | 5/2007 | Onderko et al. | |
| 7,755,484 B2 * | 7/2010 | Cullen et al. | ............... 340/572.1 |
| 2005/0140511 A1 | 6/2005 | Bonnell et al. | |
| 2005/0159913 A1 * | 7/2005 | Ariyoshi et al. | ............. 702/122 |
| 2006/0068701 A1 | 3/2006 | Chapman et al. | |
| 2007/0040687 A1 | 2/2007 | Reynolds | |
| 2007/0202811 A1 | 8/2007 | Chanowitz | |
| 2007/0205957 A1 | 9/2007 | Chapman | |
| 2008/0025778 A1 * | 1/2008 | Ito et al. | .......................... 400/76 |

OTHER PUBLICATIONS

Design of UHF RFID Emulators with Applications to RFID Testing and Data Transport, (Redemske, R.; Fletcher, R.; Automatic Identification Advanced Technologies, 2005. Fourth IEEE Workshop on Oct. 17-18, 2005 pp. 193-198.

Characterizing UHF RFID Readability for Product Packaging of Consumer Electronics ; downloaded: http://autoidlabs.mit.edu/convocation/2006_10_26_Shanghai/presentations/T1_5_Jin_Mitsugi_UHF_Test.pdf.

VisionGate™ system by Intellident Ltd.<http://www.intellidentnews.co.uk/en/3.00/ms0705.php>, downloaded: http://www.rfidglobal.org/product/2007_8/visiongate_dynamic_rfid_portal.html.

* cited by examiner

*Primary Examiner* — Tai T Nguyen
(74) *Attorney, Agent, or Firm* — Turocy & Watson, LLP

(57) ABSTRACT

This invention presents an apparatus and system and its accompanying method for automatically placing of RFID antennas and a method for obtaining a readable region for passive RFID Tags are disclosed. The apparatus and system include a Portable and Adjustable Mounting Framework (PAMF) with built in chain belt for holding the RFID antennas, an Antenna Position Controller (APC) and Antenna Position Holders (APH) for control the movement of the antennas, a Moveable Object Platform (MOP) for carrying a number of RFID tags and a Computer Integrated System (CIS) with Readable Region Analysis (RRA) software to capture the transmitted and received RF signal from/to the RFID readers.

7 Claims, 20 Drawing Sheets

METHOD AND SYSTEM FOR DETERMINING THE PLACEMENT OF RFID ANTENNAS TO OBTAIN A READABLE REGION FOR RFID TAGS

CROSS-REFERENCE TO RELATED APPLICATIONS

This application claims priority of provisional application entitled "Apparatus and System for Determining the Placement of RFID Antennas to Obtain a Readable Region for Passive RFID Tags and Method Thereof," filed on Jun. 20, 2007, with Ser. No. 60/936,293, and the entire disclosure of which is herein incorporated by reference.

BACKGROUND

1. Field of the Invention

This invention relates to techniques relating to successful RFID deployment. In particular, it relates to an apparatus and its accompanying system for automatic placement of RFID antennas and a method for obtaining a readable region for passive RFID Tags.

2. Description of Related Art

Radio-Frequency Identification ("RFID") is an automatic identification method that relies on small electronic devices to transmit and receive radio frequency signal for the purpose of identification.

RFID devices are mainly grouped into readers and tags. An RFID reader is a device equipped with antennas to read data from and write data to an RFID tag via demodulation of radio waves. An RFID tag consists of a small chip and an antenna; the chip picks up radio frequency signals beamed at it from a reader device, and beams back signals modulated with data anywhere from a couple of inches to up to 20 or 30 feet away. The chip is also capable of carrying up to a few kilobytes of data. The tag with a unique identification number can be attached to or incorporated into a product, animal, or person and the stored information can be remotely retrieved through the modulated signals by the reader device for identification of the attached object.

The radio frequency ("RF") signal returned from the RFID tag can be received by the reader, and the strength of the signal can be measured using Received Signal Strength Indication ("RSSI"). RSSI is a generic radio receiver technology metric. The RSSI value is usually transparent to the user of the receiver, but it can be used to indicate the readability of the RFID tag.

There are two types of RFID tags: active and passive. Active tags generate RF signals actively using the power from their own batteries. Passive tags can only emit RF signals based on those received from the readers in proximity. Hence, the effective range, or signal strength, of active tags is generally larger than that of the passive tags. However, passive tags are cheaper and smaller than their active counterparts.

RFID technology has been used by thousands of companies for a decade or more, and the benefits of the RFID applications had been claimed to improve productivity and reduce operation cost. Until recently, the technology is widely applied to four main areas:
1) Supply Chain Management,
2) Identification,
3) Transportation, and
4) Anti-counterfeiting.

The performance of RFID devices, however, can vary significantly across different brands and models (e.g., Alien ALN-9554, Alien ALN-9540, Impinj IPJ_N_M_EA and Omron V750-D22M01-IM). A successful RFID deployment depends not only on the product specification and standard, but also on other variables such as reader collision, tag collision, the natural environment factors. As such, it is a non-trivial task to locate precisely whether the causes of an unsatisfactory RFID deployment are due to the problems with tag reading distance, tag orientation, antenna geometry, read rate, detuned frequencies, multi-path effects, readers' emitting power, or other factors. One may explore these factors using a trial and error approach. However, the exploration process is overly tedious, and the result is likely random.

Therefore, there is a need for an invention comprising a novel measurement system, including software and hardware solutions, to locate precisely the causes of an unsatisfactory RFID deployment.

SUMMARY

Novel methods, apparatus, and system are presented for a successful RFID deployment, comprising automatic placement of RFID antennas and obtainment of a readable region for passive RFID Tags, are disclosed. The apparatus and system includes at least a Portable and Adjustable Mounting Framework ("PAMF") with built in chain belt for holding the RFID antennas, an Antenna Position Controller ("APC") and Antenna Position Holders ("APH") for controlling the movement of the antennas, a Moveable Object Platform ("MOP") for carrying a number of RFID tags, and a Computer Integrated System ("CIS") with Readable Region Analysis ("RRA") software for capturing the transmitted and received RF signal from/to the RFID reader.

The height and width of the PAMF can be adjusted according to different applications. The PAMF consists of three sets of poles; each pole can be attached with a RFID antenna. The antennas can be moved along the PAMF by the attached computer controlled APH mechanism. The APC can command the APH in up-down or left-right direction movement as well as rotation in both azimuth and elevation angles.

A set of passive RFID tags is arranged to a desired format which is called Structured Tag Population ("STP") for the repeatability of testing. This STP can be moved around in a predefined region via the computerized moveable object platform ("MOP"). Test Points can be set for simulating the plurality of location of this RFID STP along a routing path on the floor plane. The MOP consists of sets of wheels for moving forward or backward, and/or for the left and right directions.

The CIS consists of 5 major components: which are (1) Main Engine ("ME"), (2) Graphical User Interface ("GUI"), (3) Input/Output Control ("IOC"), (4) Database ("DB") and (5) Device Parameters Manager ("DPM"). These components can also be short-handed as CIS-ME, CIS-GUI, CIS-IOC, CIS-DB and CIS-DPM respectively. The CIS-GUI provides a graphical user interface for user to configure the testing parameters such as antenna position, the Test Point information of the MOP and the settings of the RFID reader. The received RFID tag information can be recorded and stored in the system database CIS-DB for further analysis by RRA.

The RRA package is developed to analyze the input parameters and readings; the analyzed result is presented in both tabular and graphical format to show the readable region of the tags in order to aid users in setting up the RFID devices for their application. An RRA analytical method is used to visualize the compiled data by the CIS-GUI in "surface-plot" and "heat-map" graphical presentation. To precisely describe the STP under the testing environment, our invention uses different techniques to represent the 3-dimensional relationship between RFID antennas and the STP mounted on the MOP. Firstly, there is a scanning mesh formed by at least 2 antennas traveling at 2 orthogonal directions, named as x and y axis respectively, to capture the RSSI value of the tags examined. Secondly, a number of Test Points on the floor (named as z-plane) are assigned to MOP. Hence, the plane of x antenna, y antenna and the z-plan conceptually form a 3-dimensional orthogonal plane for better describing the relationship between RFID tags and antennas. The MOP will move to every Test Point and such series of Test Points generates a simple routing path for the MOP to travel.

Another aspect of the invention comprises the RRA algorithm. The algorithm includes two steps to generate a readable region for the tag population along the routing path. During the first step, a scan is conducted for the whole mesh area at a test point in order to capture the RSSI value of each tag with respect to x and y antenna position. In addition, a multidimensional metrics problem is generated due to the uniqueness of each tag. Second, by using a transformation function, it is possible to combine all tags' RSSI value to a single metric with respect to each x and y antennas position at that Test Point. One possible transformation function to use is to obtain a mathematical product of the radio signal strengths perceived from each tag by the reader device. This is referred to as "dot-product of RSSI" in subsequent explanation. Since signal strengths are represented using a log scale in RSSI values, the dot-product is therefore a summation of RSSI values of these signals. Then a surface-plot named as Best_Antennas_Position of the dot-product of RSSI value against x and y can be plotted. The two processes are repeated for each desired Test Point. Each Test Point gives a unique dot-product of RSSI surface plot. Similarly, by applying the dot-product to Best_Antennas_Position with respect to each Test Point, another surface-plot named as Readable Region is formed.

The above mentioned surface-plots can be easily visualized by a 3-dimensional view, but it is hard to differentiate the changes on the surface. Hence, by converting the magnitude of the dot-product value to a color code e.g. RGB, such 3-dimensional view can be easily reduced to 2-dimensional heat-map presentation. Finally, the surface-plot and heat-map for RFID visualization are implemented and shown by CIS-GUI.

Traditionally, users need to manually adjust the antennas position in order to obtain the best read-rate of a tag population in their application field. As mentioned above the read rate of the tag population varies with various number of physical factors e.g. physical size of the testing equipment, space constraint of tags in the field, time variant property of RF signal, non real-time data analysis system and etc. Hence, the invention of a "on site measurement system" including a PAMF, a computerized Antenna Position Controller, and Antenna Position Holders, a moveable object platform for a tags' population platform and a Computer Integrated System with comprehensive graphical analytical tool, is proposed for assisting users in configure the RFID devices for determining the readable region of a tag population. There is a Readable Region Analysis (RRA) method to support the implementation.

In another aspect, the invention discloses a method for obtaining a Readable Region for passive RFID tags, comprising a graphical user interface for setting up the RFID application environment with visualized received RSSI value of tags in graphical format, and determining the tags' Readable Region based on the received tag information from plurality of antenna positions and MOP Test Points. The visual display comprises displaying the parameters settings of the RFID reader on a computer screen. Furthermore, the user is allowed to modify or update the parameters settings of RFID reader, enabling the user to control the movement of each antenna with visual displays of information and instructions about transmit power, transmit angle and distance, and the control the MOP with visual displays of information and instructions including the predetermined Test Points. The parameter settings are collected into the CIS-DB database for subsequent statistical analysis.

The graphical presentation of the receiving RSSI value is based on the average RSSI value of each tag on MOP that captured from plurality of antenna positions and plurality of MOP Test Points. Each square symbol represents an individual identified RFID tag is shown on the display unit. The graphical representation further comprises a color heat-map to indicate each level of RSSI value. The different levels of color tone between two defined colors; one color defined for the maximum RSSI value and the other color defined for the minimum RSSI value, are used to indicate each level of RSSI value. A third separate color tone is also defined for the undetected tag.

The method of this invention further comprises automatic plotting of RSSI value of each identified RFID tag, relative to the antennas and MOP Test Points, which are retrieved from the database. A Readable Region of the tags is generated based on the dot-product of RSSI value of each tag in plurality of antenna positions and MOP Test Points. The compiled data are transformed diagrammatically into one or more heat-maps to determine the best antenna positions for providing a Readable Region for the multiple tags along all MOP Test Points. The heat map may comprise one or more colors; the different levels of color tone between two defined colors are used to indicate each dot-product of RSSI values.

This invention discloses a scientific analysis method, apparatus and system for performing a repeatable, reliable, and real-time measurements of the tag performance based on different combination of antennas positions. The APC, APH and extendable PAMF with built-in chain belt provide a flexible way to measure the tag performance in different scenes. RRA software with analytical tool supports multiple sampling data feature which can filter out the variance of tags' response against time such as behavior caused by frequency hopping for one of the EPC Gen2 Air Communication Protocol standards. Special effort on the graphical user interface ("GUI") design provides a better understanding of tags performance against different antennas positions and indicates the consistency of the tags' performance in order to improve the reliability of the measurement.

BRIEF DESCRIPTION OF THE DRAWINGS

Like reference numbers and designations in the different figures indicate like elements. However, the reverse is not always true in that like elements may be labeled with different reference numbers in different drawings.

DETAILED DESCRIPTION

The presented invention is for acquiring the readability of a tag population from a provided reader. Readability of the tags depend on several factors, in our invention the following factors are focus:
 a. Number of tags
 b. Number of antennas
 c. Orientation of antennas with respect to tags
 d. Orientation of tags with respect to antennas
This invention allows the user visualize the relationships between each of the above mentioned factors in a scientific and graphical manner. The compiled results can be presented graphically to show the Readable Region of the examined tags by the provided readers, and the optimal antennas' position can be evaluated.

Figure 1:
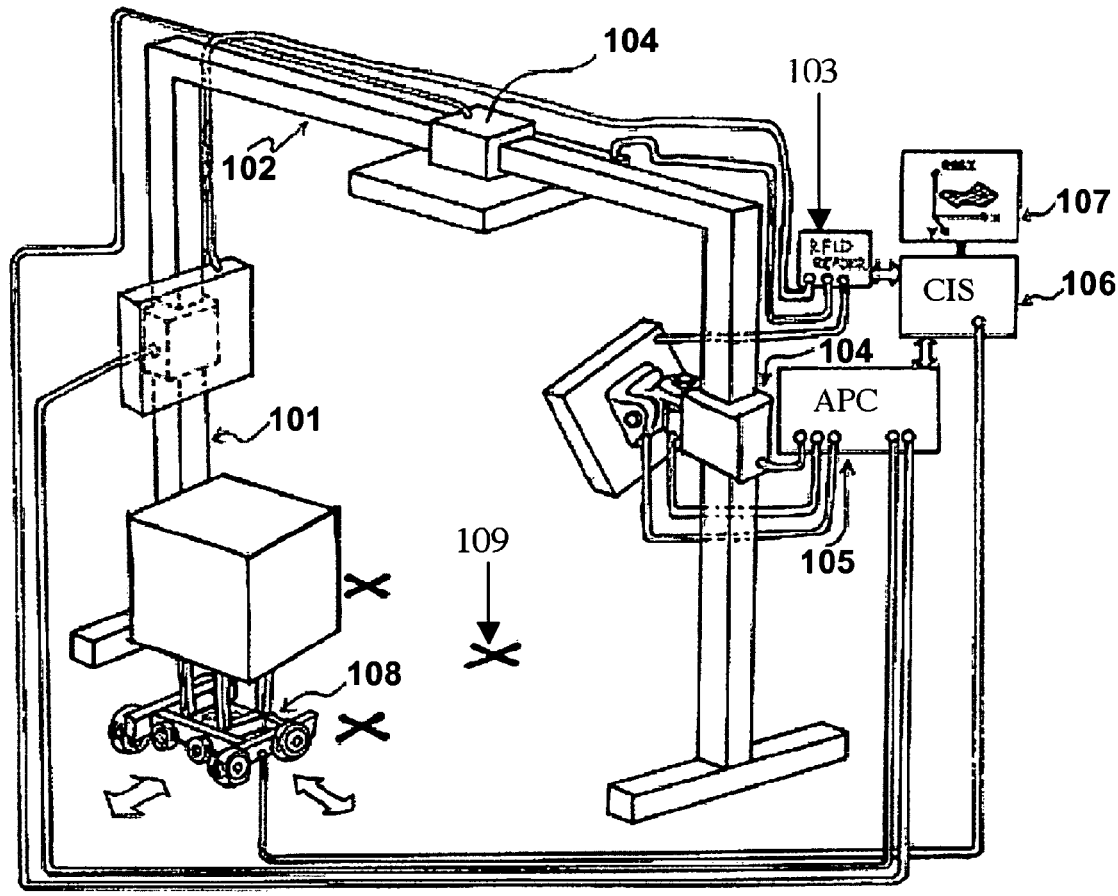
FIG. 1 is a schematic representation of the system for automatically placing of RFID antennas.

As shown in FIG. 1, the PAMF provides a support mechanism for the computerized APH 104, which provides the capability for continuously moving the antenna along the vertical 101 and horizontal 102 poles. The APC 105 controls the position of each mounted antenna. The RFID Reader 103 from the device manufacture captures the RSSI value of the STP. The captured results are manipulated at CIS 106 and displayed by the CIS-GUI component 107. A MOP 108 with a STP provides a scalable and flexible moveable multiple passive tags platform; in corporate with the computer command, the MOP can be moved to the next preset Test Point on z-plane automatically.

Figure 2:
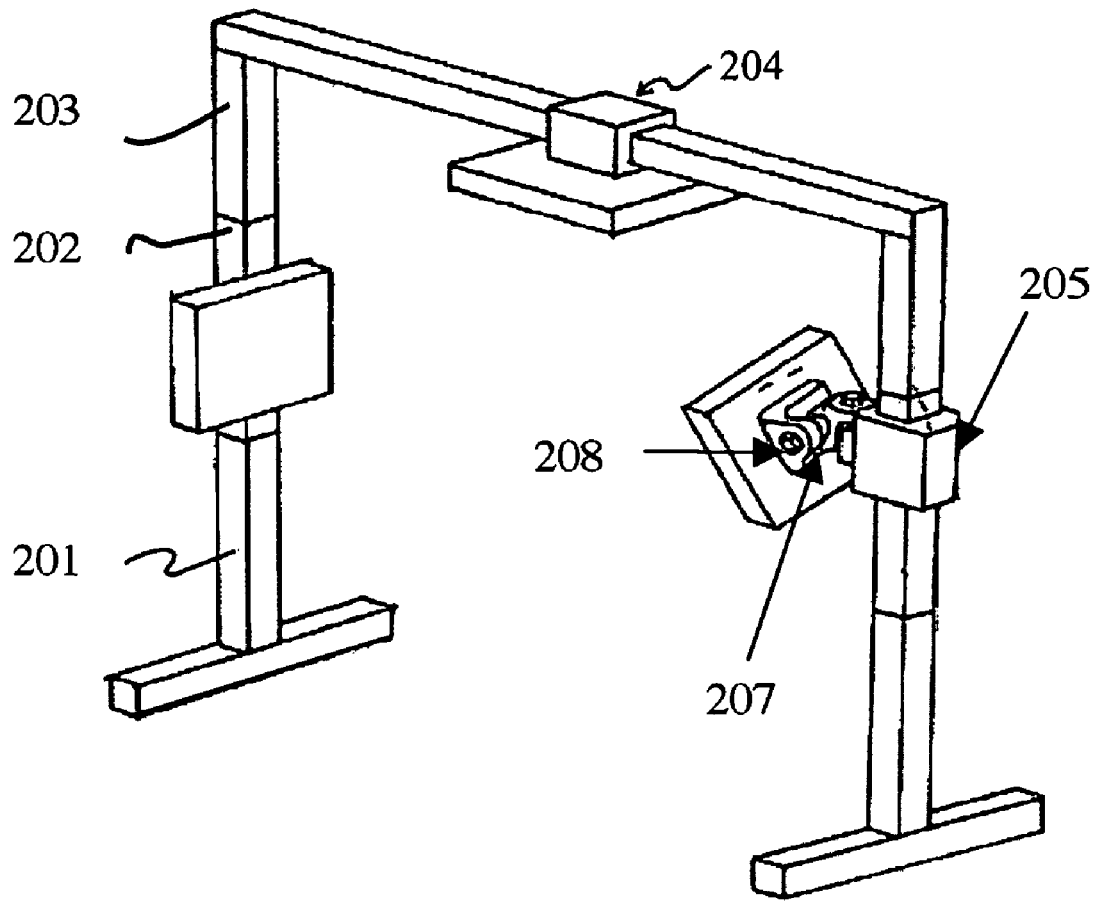
FIG. 2 is a schematic representation of the Portable and Adjustable Mounting Framework ("PAMF") for mounting the RFID antennas.

As shown in FIG. 2, the 201, 202, 203 poles available in different sizes provide a portable feature; they can be easily transported to the deployment site for reassembling. The extendable PAMF with the built-in chain belt mechanism provides a moving track function for each antenna mounted on the APH. The elevation 208 and azimuth 207 rotational mechanisms are attached on the APH 205 at the pole.

Figure 3:
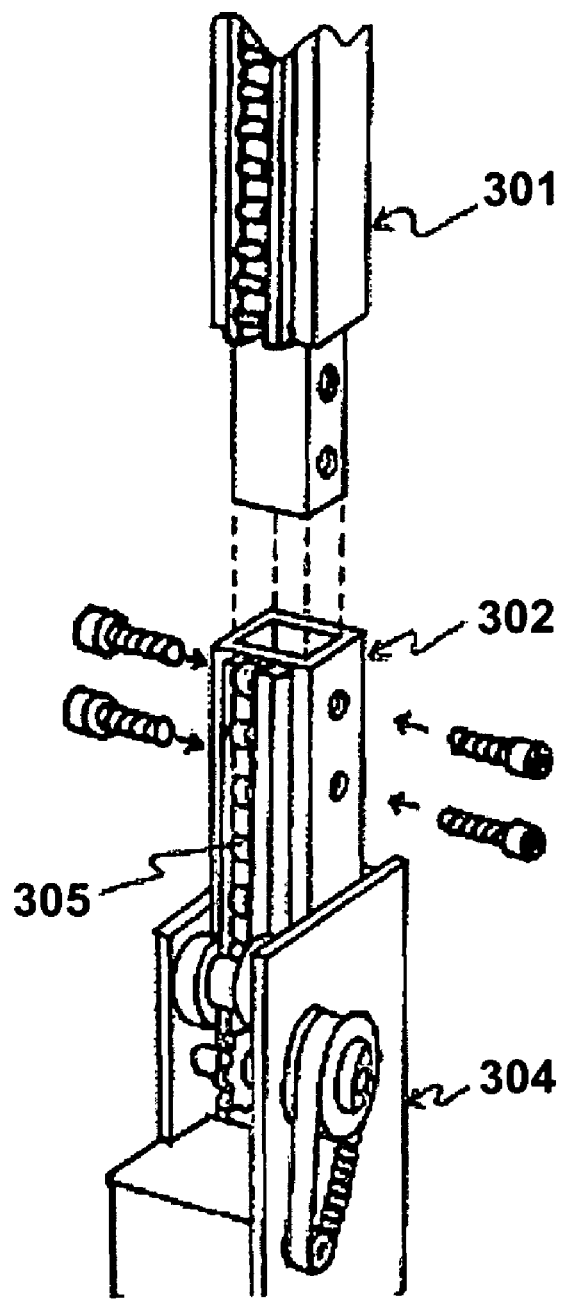
FIG. 3 illustrates of an extendable pole for the PAMF.

As shown in FIG. 3, poles of different sizes can be joined together by slotting 301 into 302 with 4 mounting screws.

Figure 4:
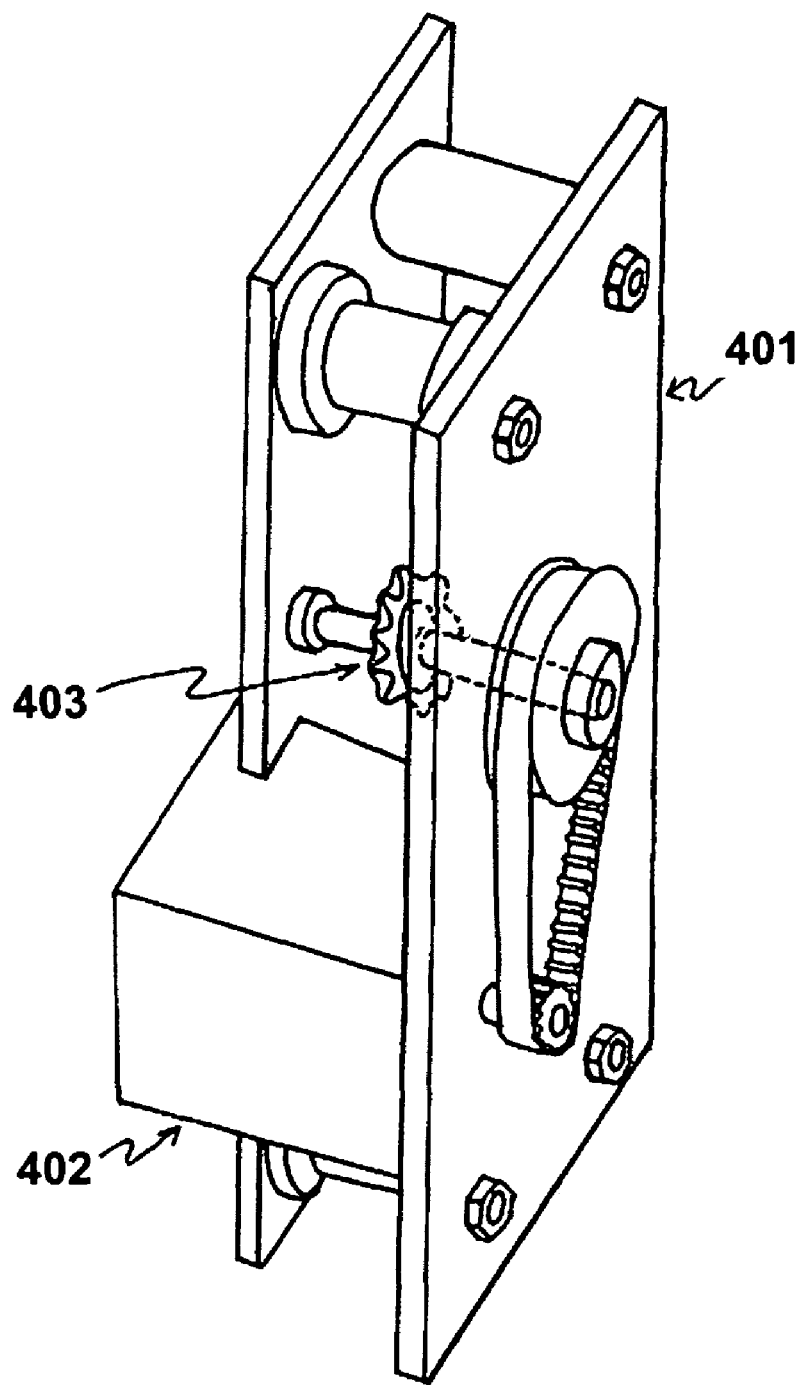
FIG. 4 illustrates a motorized Antenna Position Holder ("APH") for the PAMF.

As shown in FIG. 4, a motorized APH 401 is driven by a stepper motor 402 and is clamped the poles by nylon rollers. The stepper motor 402 drives a gear mechanism 403 to travel along the chain belt 305.

Figure 5:
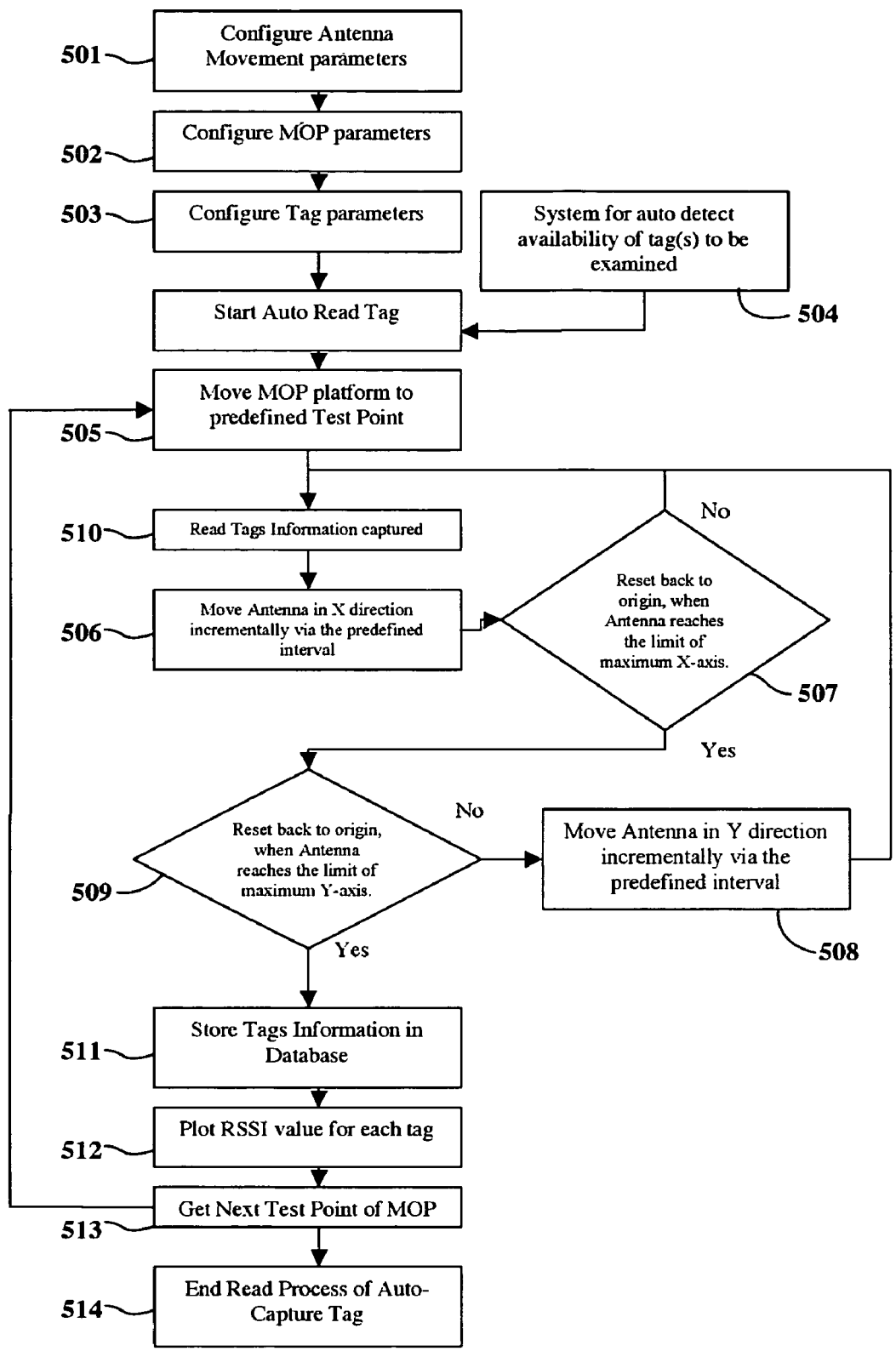
FIG. 5 is the process flow diagram of capturing the tag information from a plurality of antenna positions and MOP test points.

FIG. 5 shows the process flow to capture the tag information from plurality of antenna positions and plurality of MOP Test Points is explained in details. The antenna initialization step 501 comprises collecting the relative movement information of each antenna such as the maximum travel distance and the interval movement of each antenna. A CIS-GUI is provided to aid user in setting the movement parameters. For example if the maximum distance is set to 300 cm and the interval is set to 50 cm for each axis, the antenna will start capturing tag information at the origin point then move to next 50 cm from the origin of x axis for next capturing and thereafter, when the x axis antenna reached the maximum distance, it will reset back to the origin of the x axis and then start moving the y axis by 50 cm, the process will continue till both axes reach the maximum distance.

Referring still to FIG. 5, the Moveable Object Platform initialization step 502 comprises the process of setting the plurality of MOP Test Point, the x and y coordinates of each position are stored in the system database CIS-DB and automatically retrieved by the CIS system when the MOP is required to move to the predefine Test Point during the capture process. A graphical representation of the top view of the routing path of the Test Points is also provided to aid user to locate the Test Point for the MOP.

A tag structural initialization step 503 records the unique tag ID number, its logical location among the STP of this examined tag, and the tag information can be stored in the CIS database. A graphical representation of the tag population is provided on the CIS-GUI display; user can visually locate the tag's logical location among the STP with the aid of this display.

A tag initialization short-cut step 504 simplifies the tag logical location setting process, the CIS provides an auto detection process to capture all the tags with measurable RSSI value among the STP then allocate a default logical location for each tag automatically. This is a handy tool to speed up the tag graphical placement process and supplement by manual input step 503 if necessary.

Process step 505 retrieves the Test Point for the MOP from the CIS database. The CIS then sends the command to the MOP, to move to the MOP to the desired Test Point which is shown immediately on the screen 801 of FIG. 8 too.

Steps 506 and 508 provide the moving distance for each antenna; the distances are based on the interval value set on the step 501. The system commands the APC to move the mounted antenna to the required position. The antenna position can be visualized as a position pointer on the baseline on the CIS-GUI display 1002 of FIG. 10.

Checking process steps 507 and 509 indicate that when the antenna hits the maximum traveled distance, the CIS will commands the APC to move APH with antenna back to the origin position.

Step 510 starts the tag information capturing process such as tag's RSSI value. A number of samples of RSSI value for each tag is averaged if necessary. Step 511 stores the captured tag information into the CIS-DB database. Plotting step 512 extracts the captured RSSI value of each examined tag from each antenna from the CIS-DB database. The average RSSI value of each tag is then calculated and plotted into graph. Each tag is represented as a square symbol 1001 in the graph of FIG. 10 and the color value of each square symbol shows the strength of the RSSI value.

Figure 11:
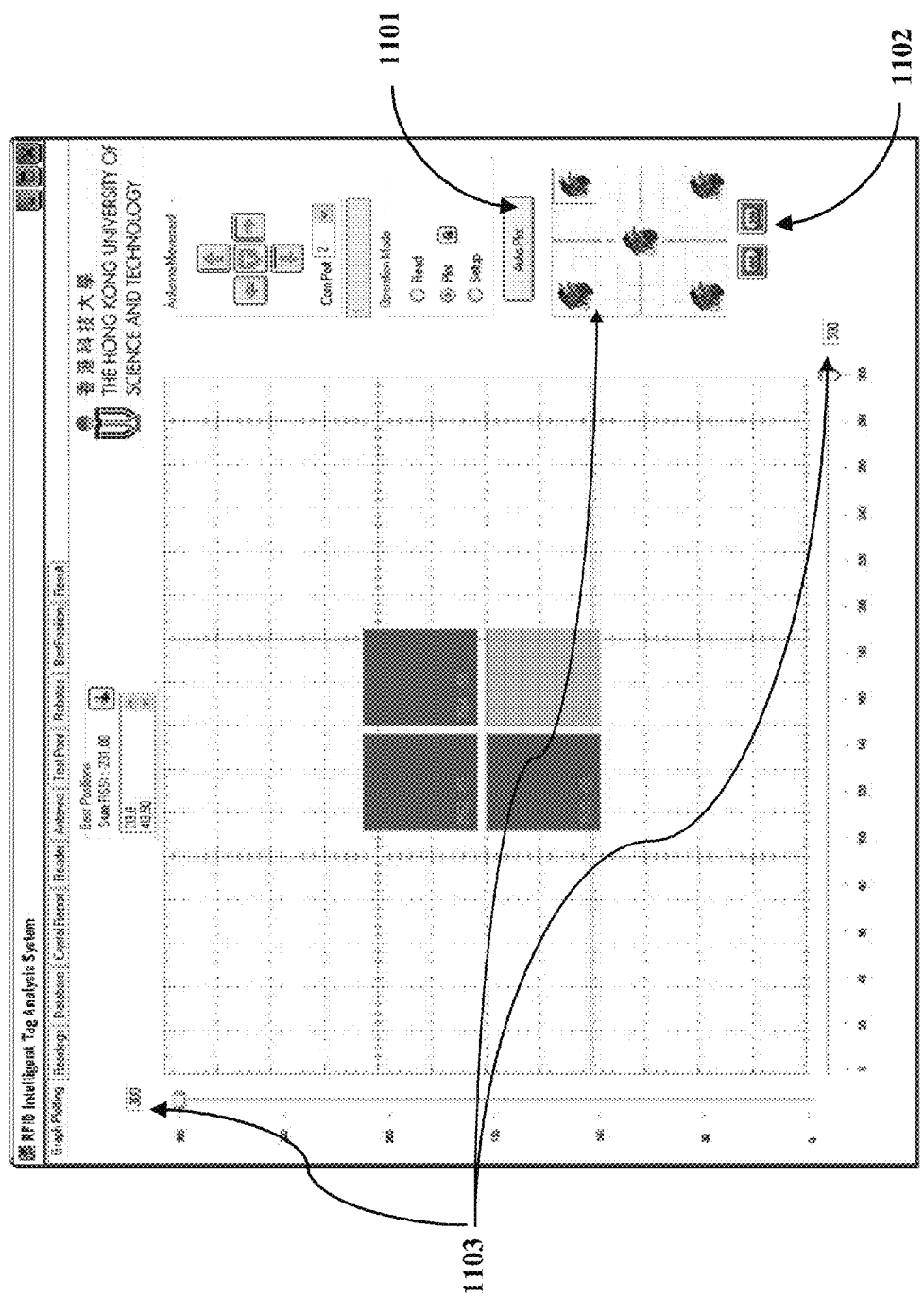
FIG. 11 demonstrates the capturing process as completed by seeing both the position pointers of antenna which has reached the maximum distance and ready for next step "Auto-Plot".
Figure 12:
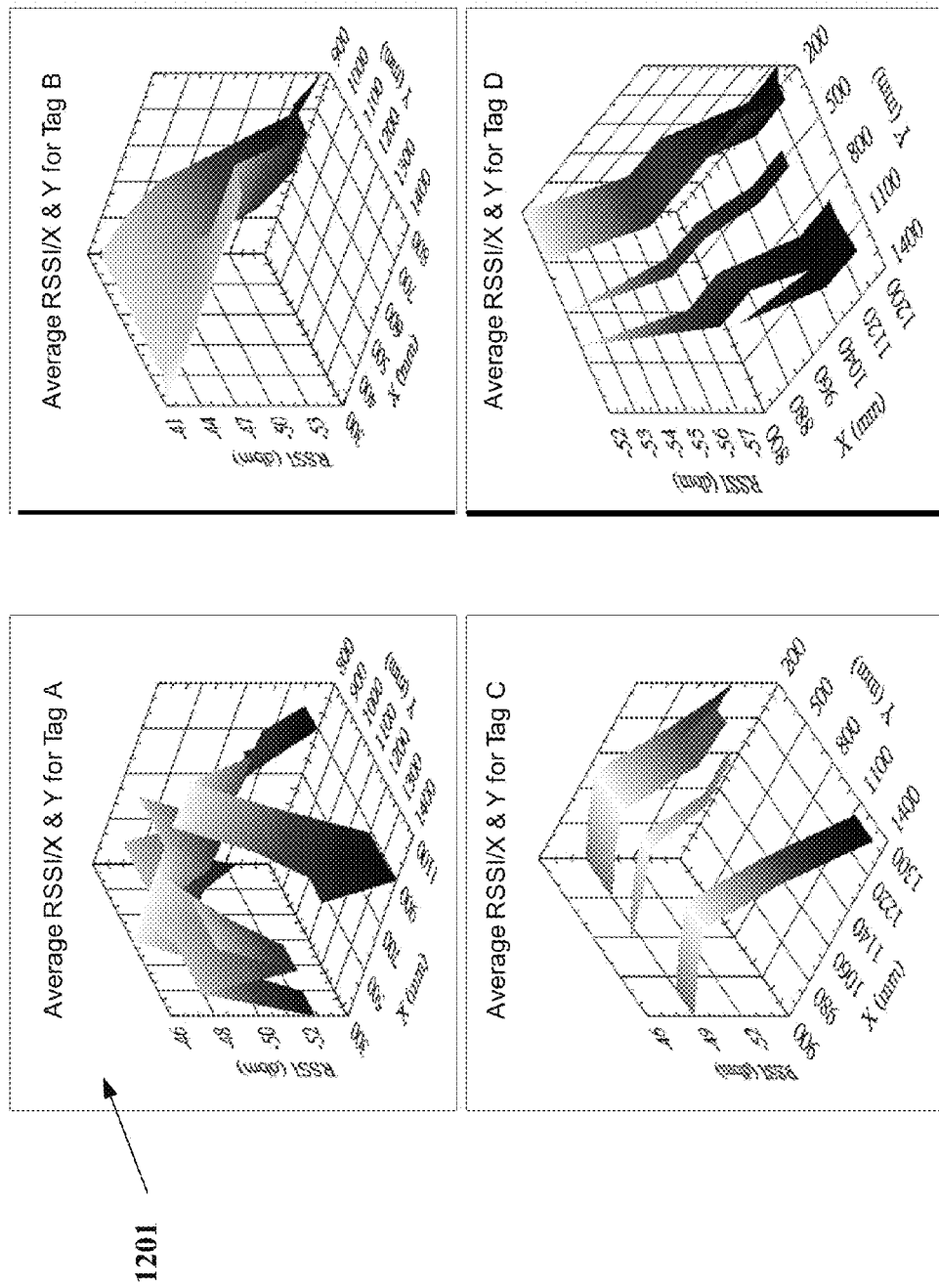
FIG. 12 illustrates different performance of the individual surface-plot of the RSSI value for each tag against x and y antenna positions.
Figure 13:
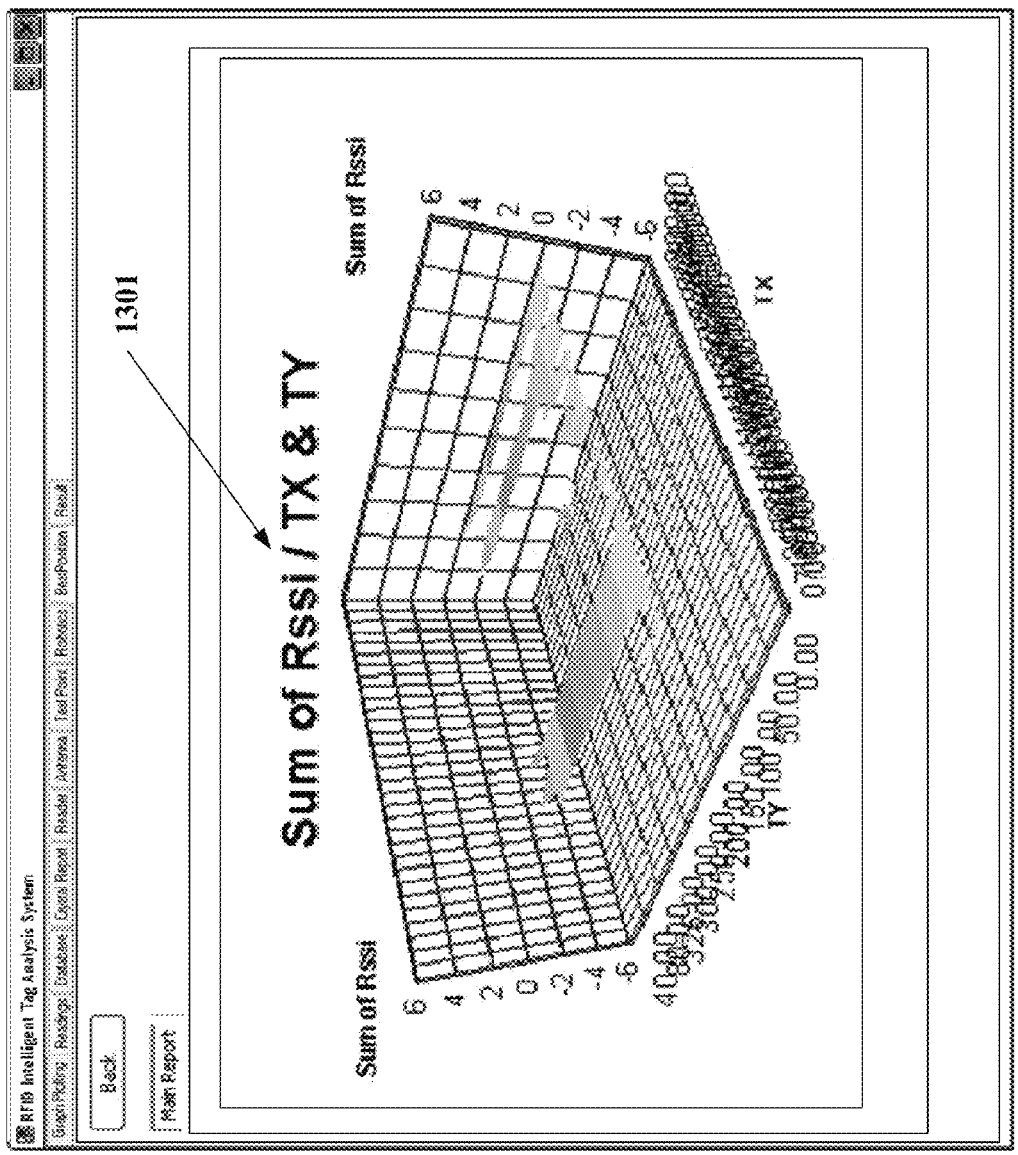
FIG. 13 is the surface-plot of Best_Antennas_Position against x and y antennas position at a given MOP Test Point.
Figure 14:
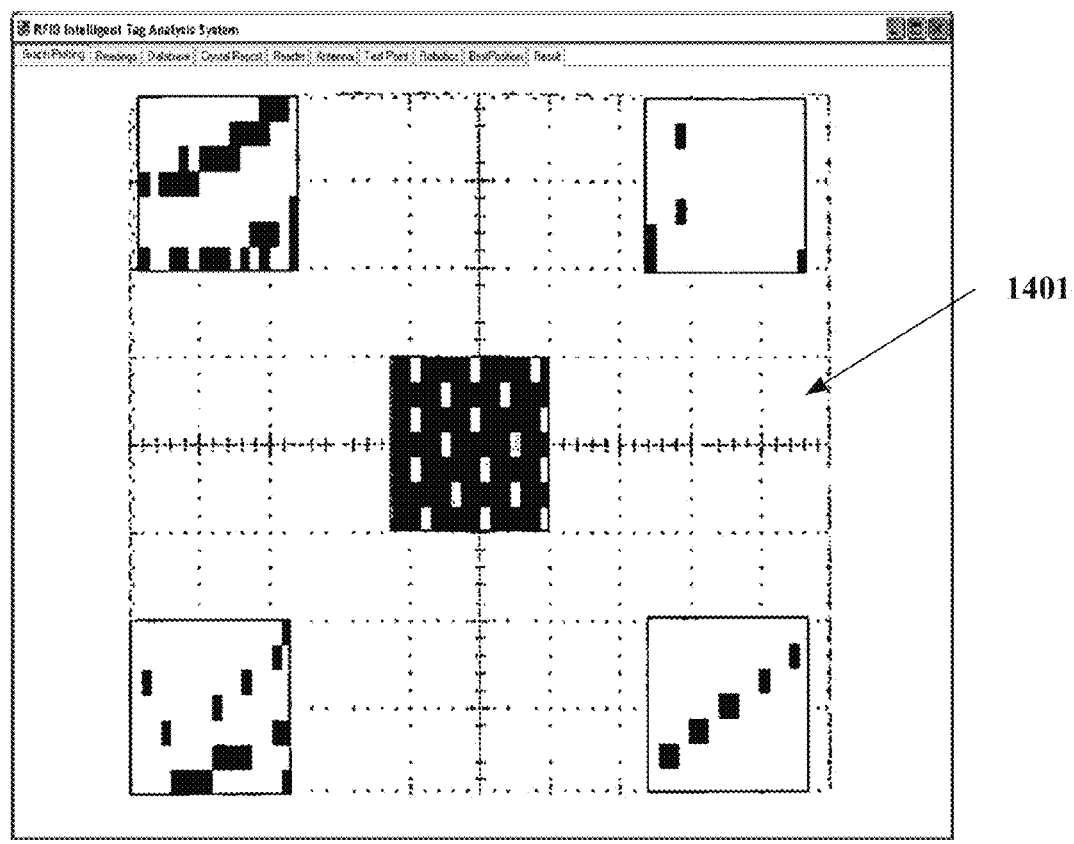
FIG. 14 is the summary of the heat-map of Best_Antennas_Position at 5 different MOP Test Points on z-plane floor map.

A forward button 1102 of FIG. 11 initiates operation 513 to move the MOP to the next predefined Test Point and repeat the whole capture process.

Figure 6:
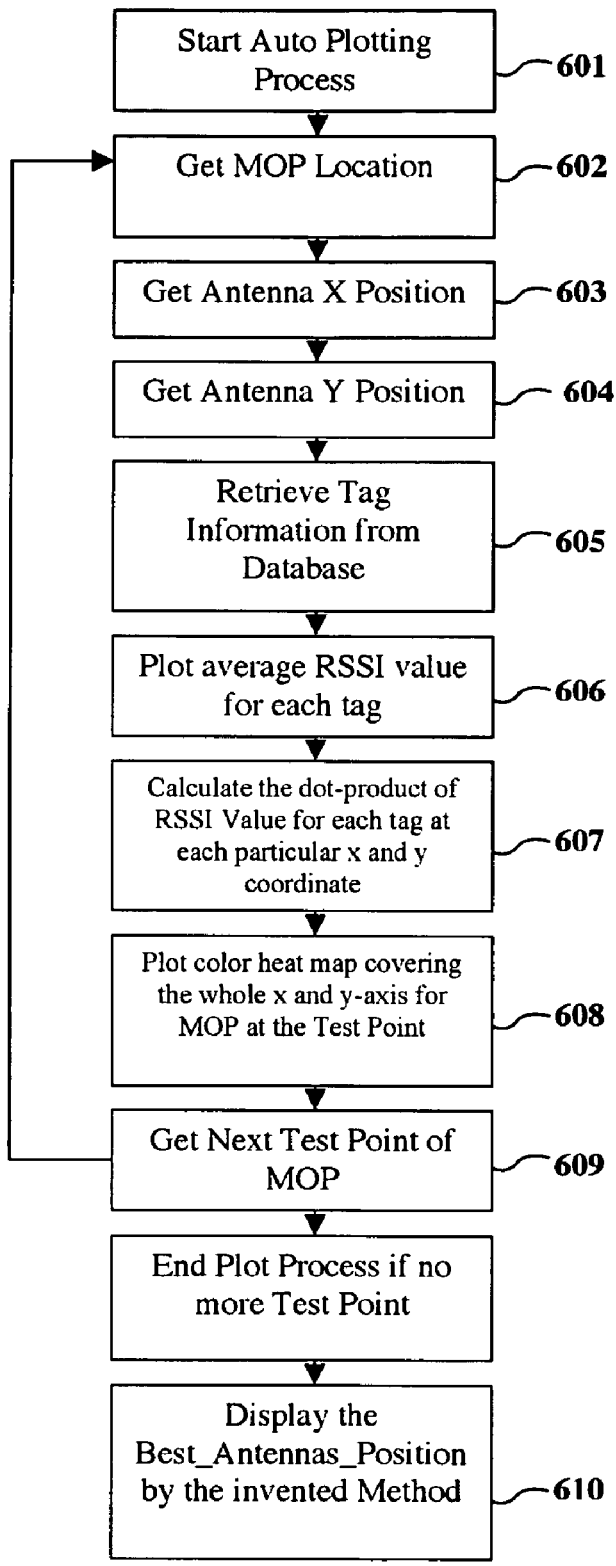
FIG. 6 is the process flow diagram of plotting the compiled data from a plurality of antenna positions and plurality of the movable object platform ("MOP") Test Points by heat-map representation.

As shown in FIG. 6, the sequence of plotting the captured tag information is explained in details. Since the original capturing process is very time consuming, this plotting facilitates a responsive and continuous visual effect to the user.

In FIG. 6, a start process 601 is initiated by clicking a button 1101 of FIG. 11 for auto-plotting the captured RSSI value at each x and y antenna positions. Steps 602, 603 and 604 retrieve the MOP Test Point and antenna moving information such as x and antenna positions from the CIS-DB as indicated by CIS-GUI 1103 of FIG. 11 and show the tag logical locations 1104 on the CIS-GUI display of the same figure.

Step 605 retrieves the captured tag information from the CIS-DB; the information is identified by the parameters of the antennas and MOP obtained from above steps 602, 603 and 604. Following, step 606 draws surface-plots 1801, 1802, 1803 and 1804 of FIG. 18 for the average RSSI value of each tag over the scanning mesh of antennas x and y. Step 607 performs the dot-product 1805 for all tags' RSSI value received over the scanning mesh of antenna x and y.

Figure 19:
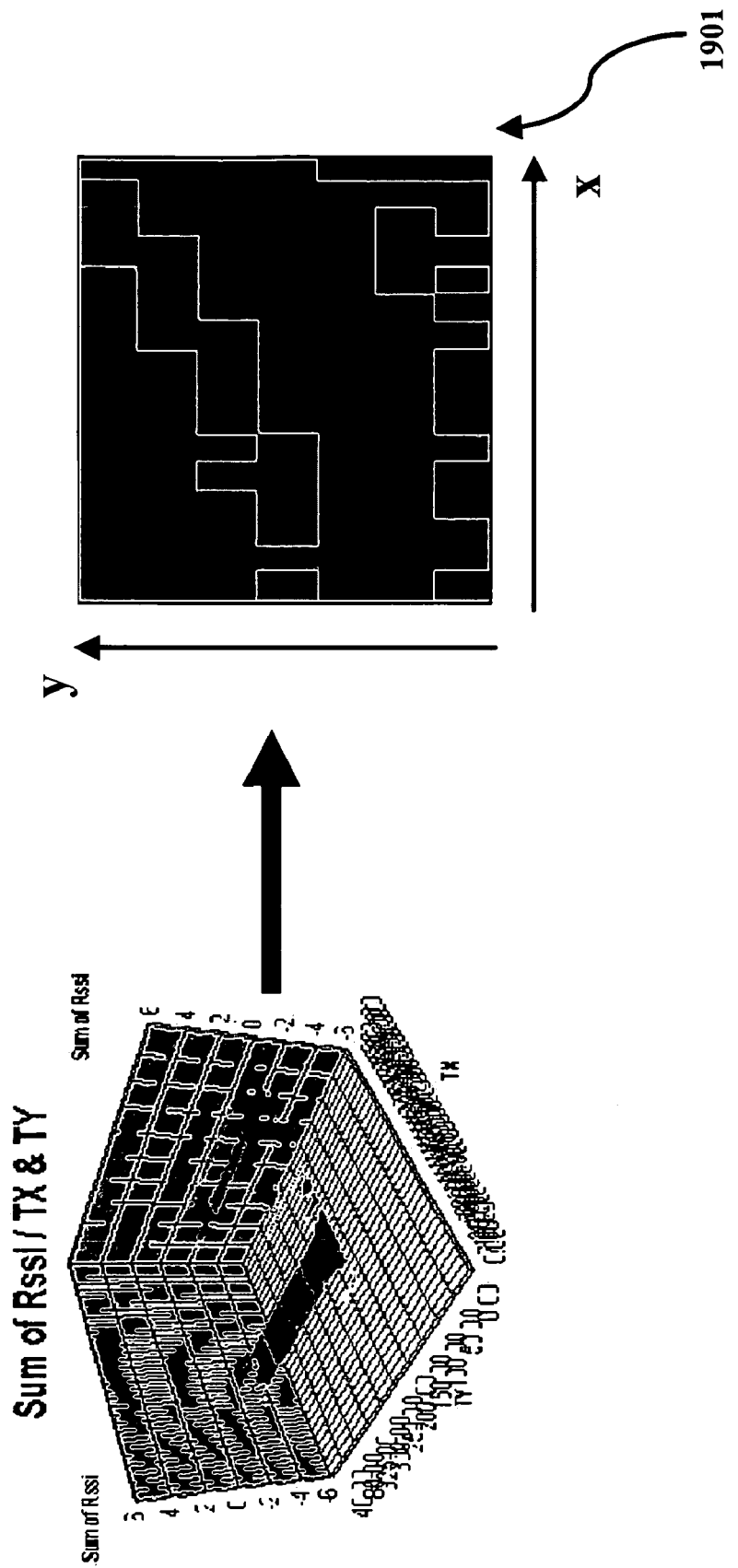
FIG. 19 illustrates the relationship of a heat-map graphical representation translation from a Best_Antennas_Position surface-plot.

Step 608 draws a heat-map of the dot-product for all tags' RSSI value 1901 of FIG. 19 over the scanning mesh of antenna x and y positions for each MOP Test Point. The heat-map shows the calculated dot-product value to a color code which could be grey if the dot-product value is null. Such heat-map gives the Best_Antennas_Position at a Test Point. Step 609 decides any more MOP Test Point needed to be retrieved from CIS-DB and repeat the whole above plotting process.

Figure 20:
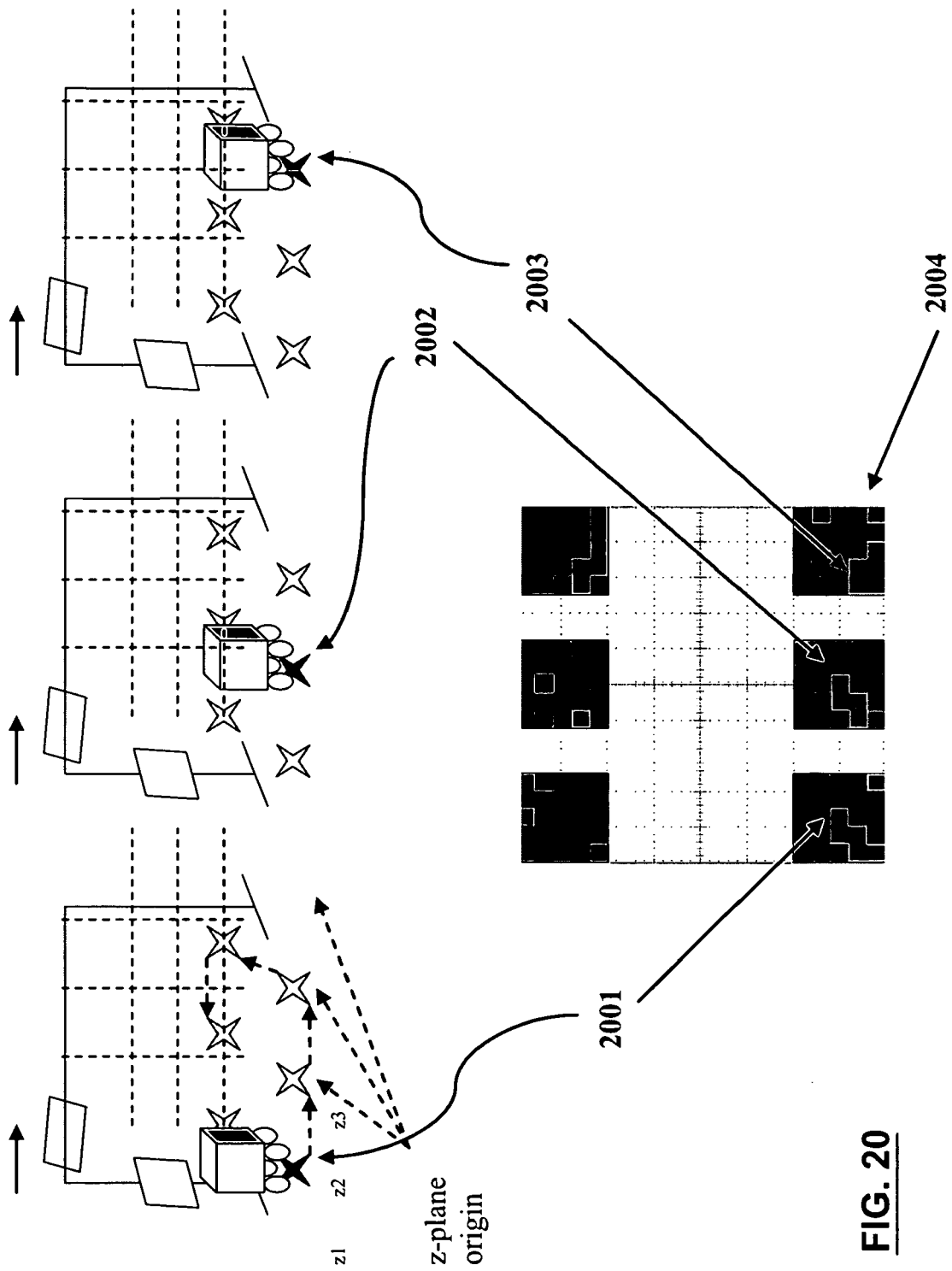
FIG. 20 illustrates the correlation of routing path and the heat-map of Best_Antennas_Postion at 6 different MOP Test Points on z-plane.

Process step 610 provides heat-map 2001, 2002 and 2003 of FIG. 20 to show the dot-product of captured RSSI values for the same scanning mesh of antennas x and y at each MOP Test Point respectively. Similarly, to correlate all the heat-maps of Best_Antennas_Position can provide a Readable Region heat-map over all Test Points. The Readable Region heat-map can aid user to estimate the placement of each antenna in order to acquire all the tags information over all Test Points along the routing path.

Figure 7:
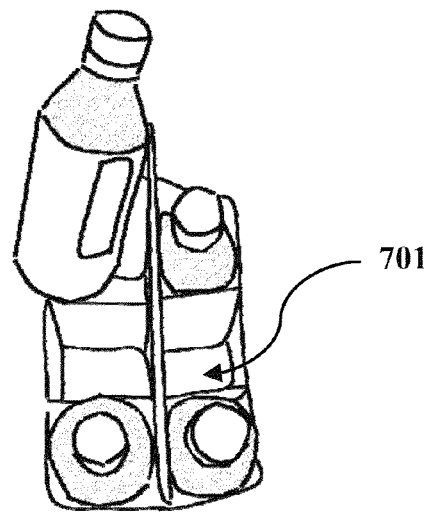
FIG. 7 illustrates an example of STP under test.
Figure 8:
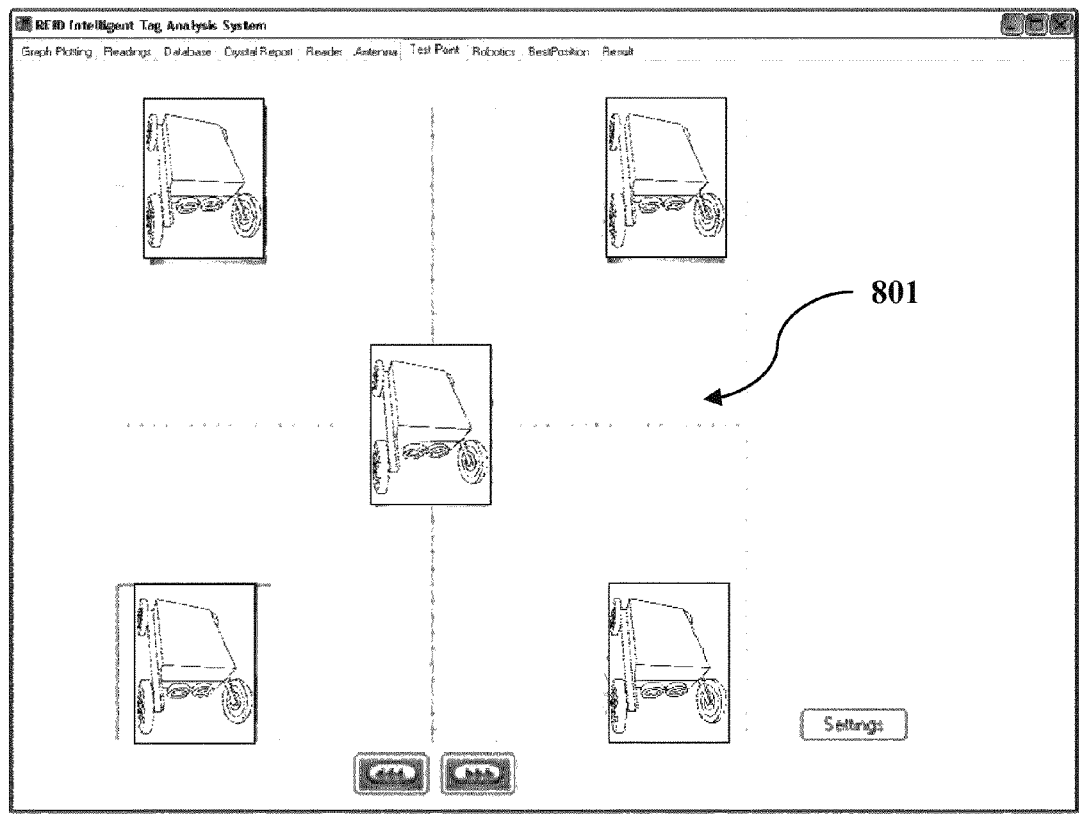
FIG. 8 illustrates the allocation of the Test Points of MOP by CIS-GUI with the assistance of a background floor map.
Figure 9:
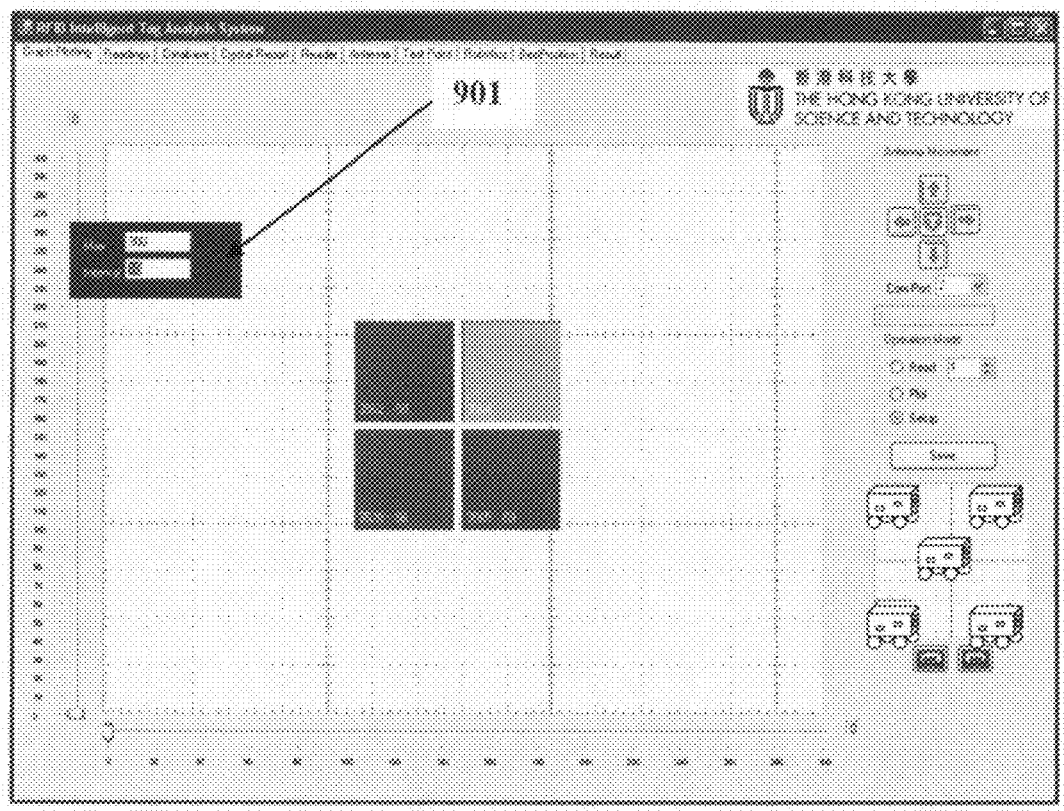
FIG. 9 illustrates the CIS-GUI for setting up the maximum x and y axis travel distance, movement interval and rotation angle of an RFID antenna.
Figure 10:
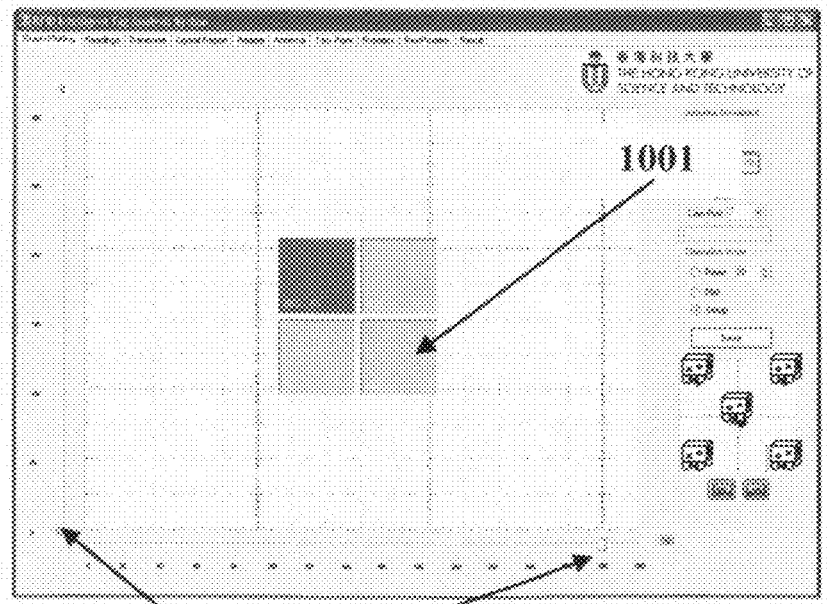
FIG. 10 demonstrates the CIS-GUI for setup of the number of tags desired for capturing and the heat-map snap shot representation of their RSSI values obtained at each x and y antenna position and indicated by two position pointers respectively.
Figure 15:
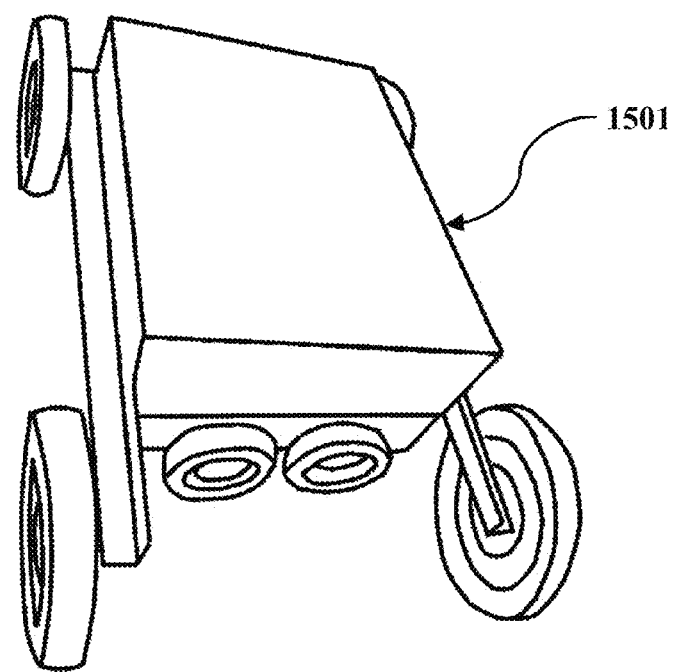
FIG. 15 is a sample implementation of a MOP for carrying the Structured Tag Population ("STP").
Figure 16:
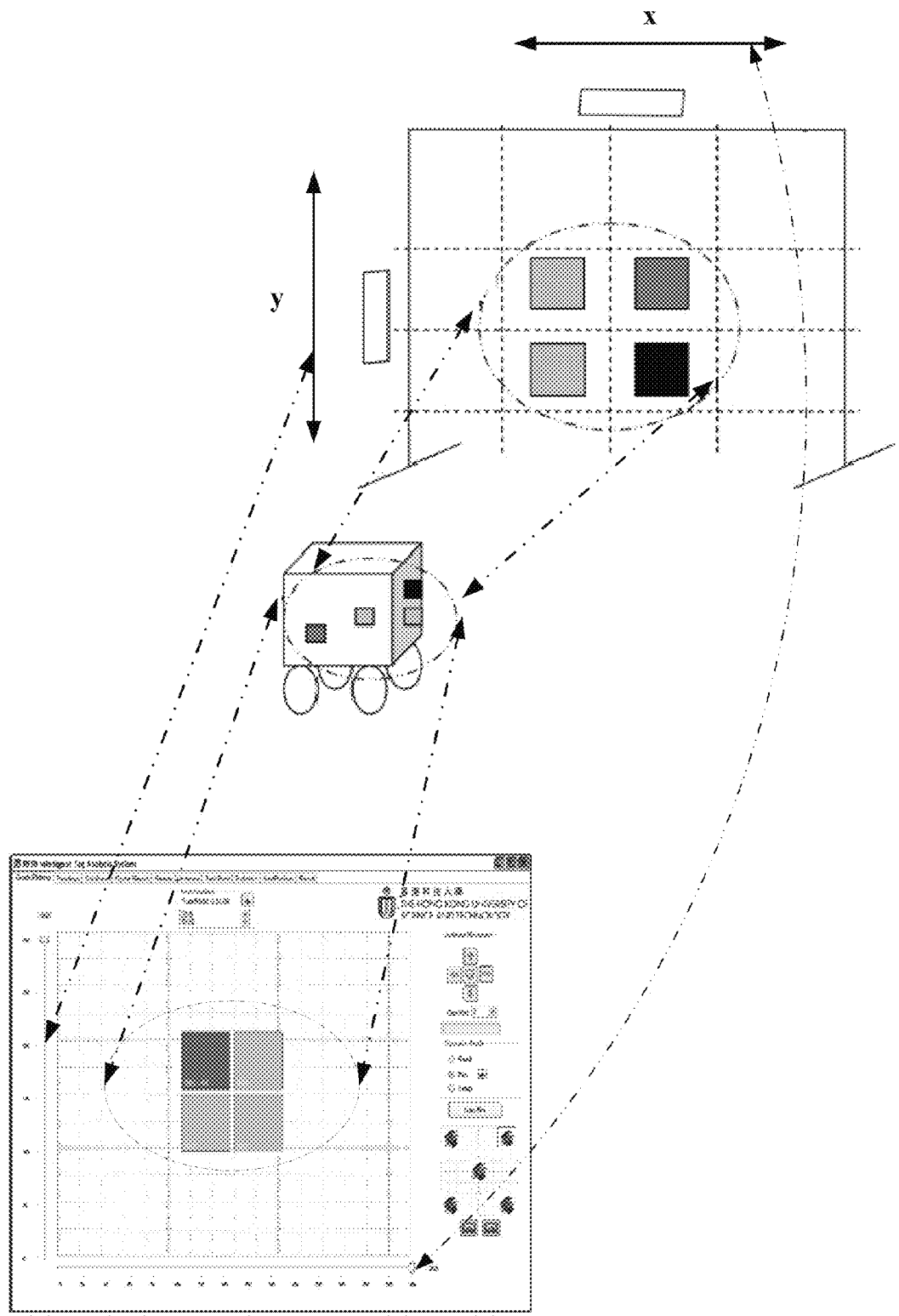
FIG. 16 is the heat-map snap shot representation of RSSI value of each tag among the STP with the help of CIS-GUI logical location projection of physical arrangement of all tags and conceptual scanning mesh of x and y antennas.

An application embodiment is given below to illustrate a setup of RFID devices to read 4 bottles of water in accordance with an implementation of the presented invention. The detailed of the experiment is description as follows:

As shown in FIG. 7, four bottles of water with four RFID tags 701 attached respectively are loaded on a MOP 1501, such as the one shown in FIG. 15. As shown in FIG. 8, user can assign the MOP Test Point with the aid of the floor map 801. As shown in FIG. 9, an antenna traveling parameters control box 901 as part of CIS-GUI aids user to setup the maximum travel distance and interval movement of each antenna at x and y-axis. As shown in FIG. 10, the number of tags and their logical locations for scanning can be easily placed on the antenna x and y-axis coordinate plane 1001.

Figure 17:
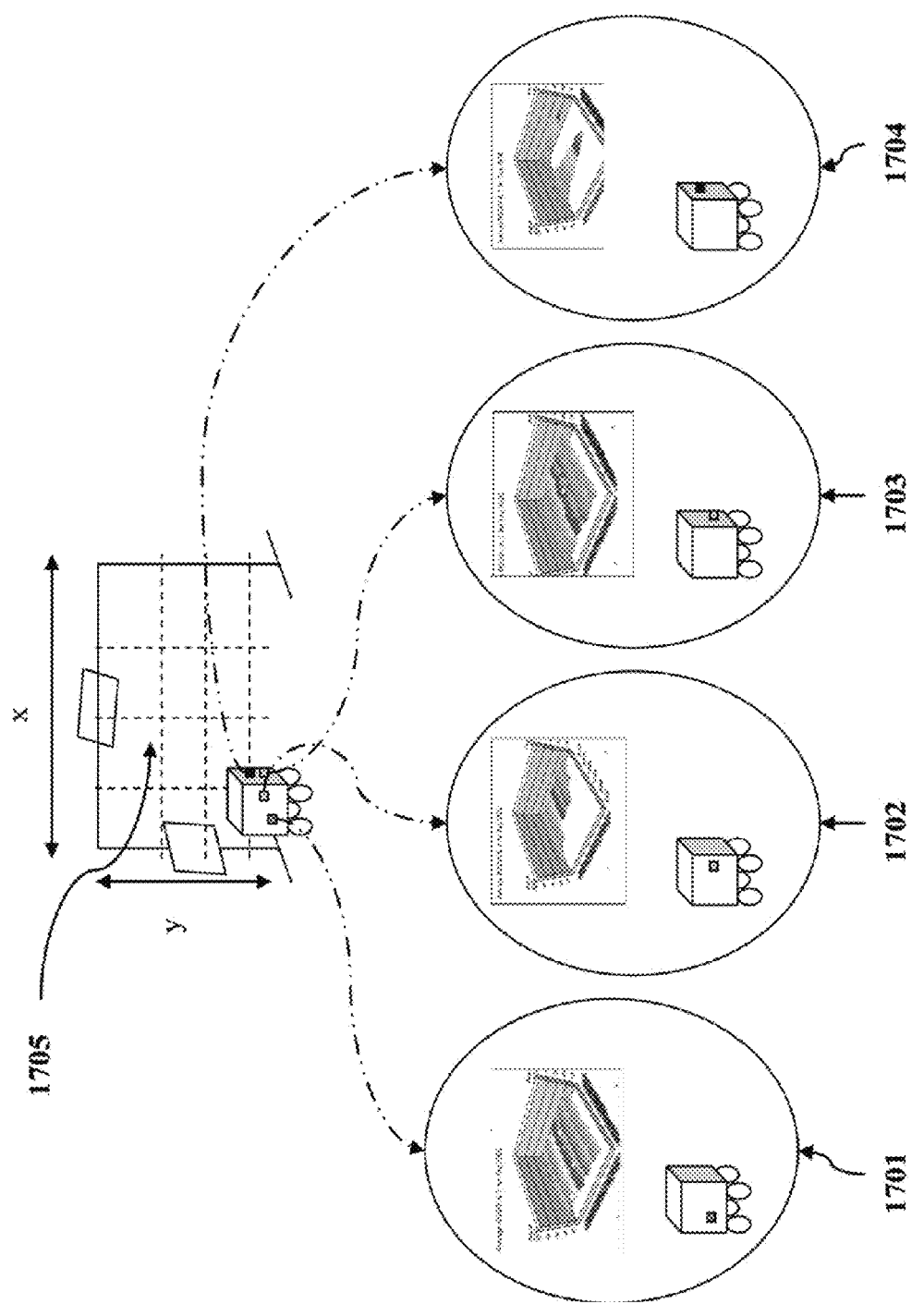
FIG. 17 illustrates the scanning mesh of antennas of the surface-plots of RSSI value against x and y antenna positions of tags at different physical location of the STP.

As shown in FIG. 11, there are many control parameters available to facilitate the tests by CIS-GUI. By activating the "Auto Read" mode using the multi-functions button 1101 to start the measurement, the system will command the APC to move to each preset x and y antennas position on the scanning mesh 1705 of FIG. 17 for data capturing, all the captured data at 1701, 1702, 1703 and 1704 will be automatically stored in CIS-DB and the captured RSSI value will be represented by different color code and showed on CIS-GUI display 1104. The data capturing process is repeated for each interval and terminated when the maximum travel distance of each antenna has been reached.

The average and dot-product of the captured RSSI value will be stored in the CIS-DB. All the captured and compiled RSSI value of each tag at each Test Point can be reviewed automatically via a kind of RSSI distribution graph.

Figure 18:
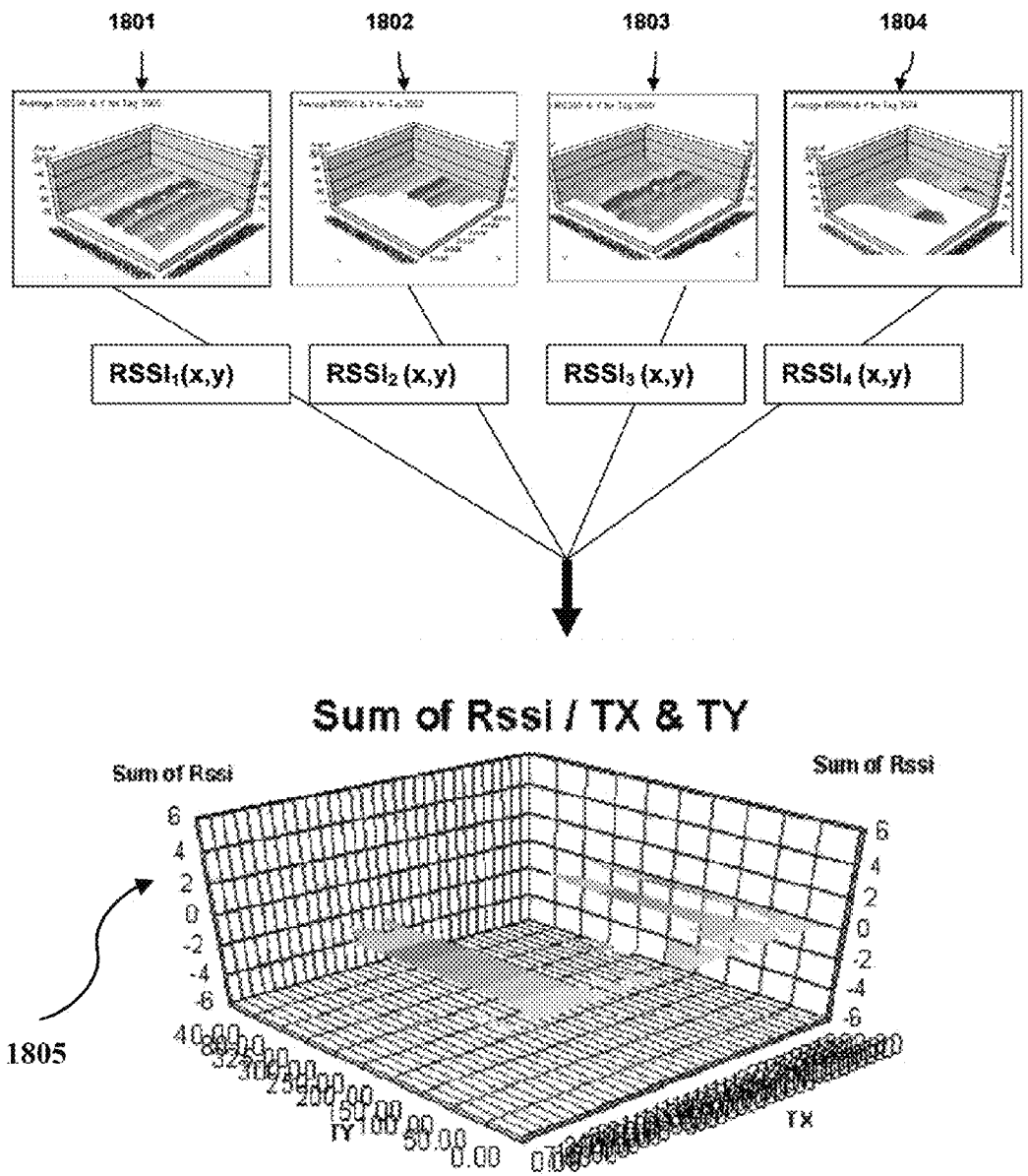
FIG. 18 illustrates the relationship of the dot-product of each tag's RSSI value against x and y antenna positions to generate the Best_Antennas_Position.

According to FIG. 18, we show the formula of calculating the Best_Antennas_Position 1805 from the dot-product of each tag's RSSI value against the x and y antenna positions. For example, each one of the tags 1801 to 1084 has a corresponding value $RSSI_i(x,y)$ where i ranges from 1 to 4. Best_Antennas_Position at z1 of a number of tags over a scanning mesh of antennas x and y is defined as below:

$$Best\_Antennas\_Position_{z1} = (RSSI(x,y), DP_{z1})$$ where $DP_{z1}(RSSI_i(x,y))$ is equal to $$\sum_{i=1}^{i=n} RSSI_i(x, y)$$

for All $RSSI_i(x, y) \neq$ Null, at (x,y) antenna position and n is the number of tags to be captured in among the scanning mesh, or null if there exist any $RSSI_i(x,y) =$ Null or undefined (if No $RSSI_i$ value is captured at the (x,y) antenna position)

According to FIG. 19, we show the formula of a heat-map graphical representation translation from a Best_Antennas_Position at different MOP Test Points on the z plane. The heat-map translation of a surface-plot of Best_Antennas_Position at any Test Point $z_1$ is defined as below:

$$HM(Best\_Antennas\_Position_{z1}) = RGB(Best\_Antennas\_Position_{z1} *$$
$$255/(Best\_Antennas\_Position_{max} - Best\_Antennas\_Position_{min}),$$

Both Best_Antennas_Position$_{max}$ and Best_Antennas_Position$_{min}$ are predefined constants and only depend on total number of tag multiplied by a constant. Graph 1901 is a sample graphical representation coming from, for example, Best_Antennas_Position 1805 of FIG. 18.

FIG. 20 shows composite 2004, which also shows correlation of routing paths and the heat-maps 2001, 2002, and 2003 of Best_Antennas_Position at different MOP Test Points on the z plane.

Figure 21:
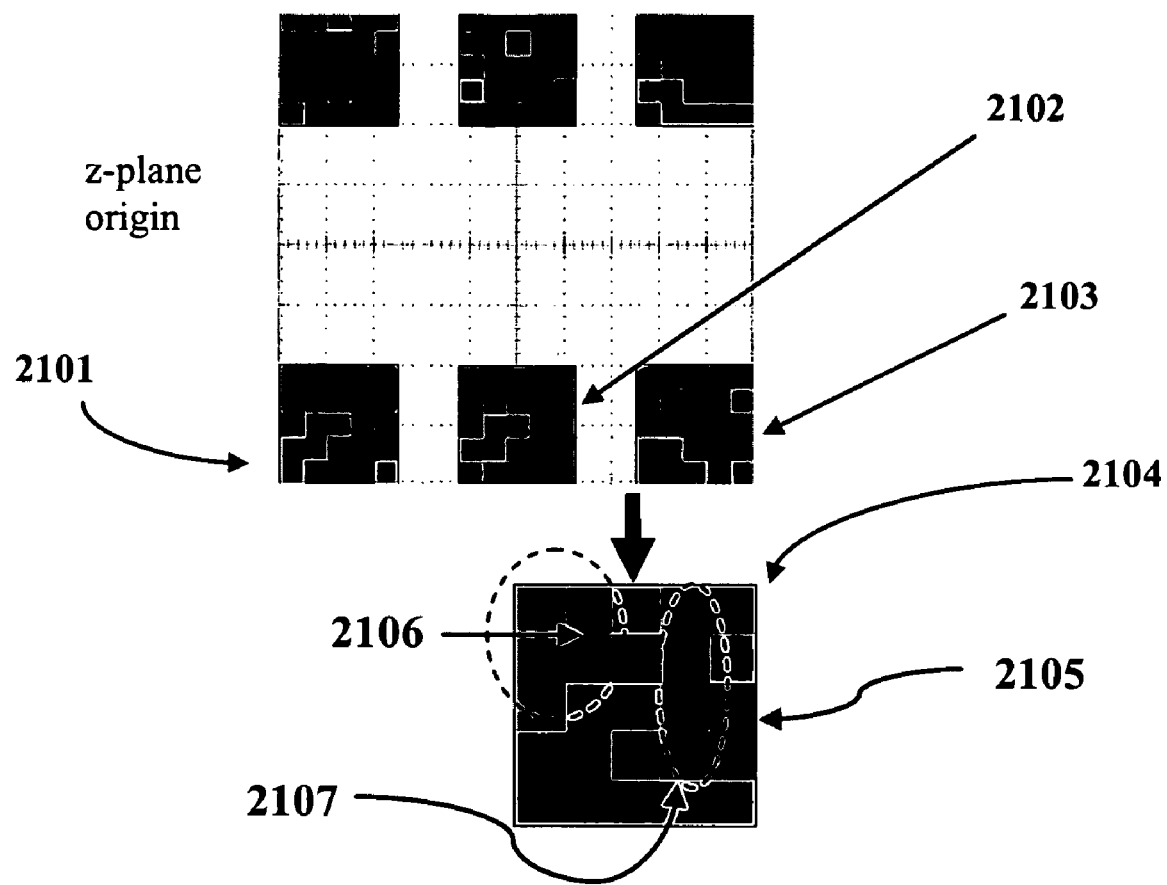
FIG. 21 illustrates the formulae of applying the dot-product of Best_Antennas_Position heat-map to generate the Readable Region.

According FIG. 21, a formula of applying the dot-product of Best_Antennas_Position heat-map to generate a Readable Region. Here, Readable Region along a number of test points $z_j$ within domain Z $(z_1, z_2, z_3, \ldots, z_M)$, is defined as below:

$$Readable\_Region = DP_M(Best\ Antennas\ Position)$$

This value is NULL if there exists any $Best\ Antennas\ Position_{z_j}$=Null or undefined, ie No RSSI value captured at the (x,y) antenna position.

Readable Region is $Best\ Antennas\ Position_{z_j}$ for j=1 to m, for all $Best\ Antennas\ Position_{z_j} \neq$ Null, at test point $z_j$ and M is the total number of test points where test points are defined as a domain Z with values $(z_1, z_2, \ldots z_M)$.

As shown in FIG. 20, the above processes will be repeated at each Test Point. The conceptual routing path covers all Test Points $z_1, z_2, z_3, \ldots$ etc. The MOP are undergone the same the scanning mesh data capturing at Test Point z2 and z3 respectively. The heat-map of Best_Antennas_Position 2001, 2002 and 2003 can be drawn by the data compiled in 608 at each Test Point e.g. $z_1, z_2$, and $z_3$ respectively.

As shown in FIG. 21 by combining all the heat-maps will generate a resultant z-plane Readable Region for all Test Points $z_1, z_2, z_3, \ldots$ etc. along the routing path. The definition of Readable Region is stated by equation 2104. The heat-map of Readable Region can indicate the placement of x and y antennas at the areas 2016 and 2017 which can have the highest possibility to read all tags at all Test Points.

Figure 22:
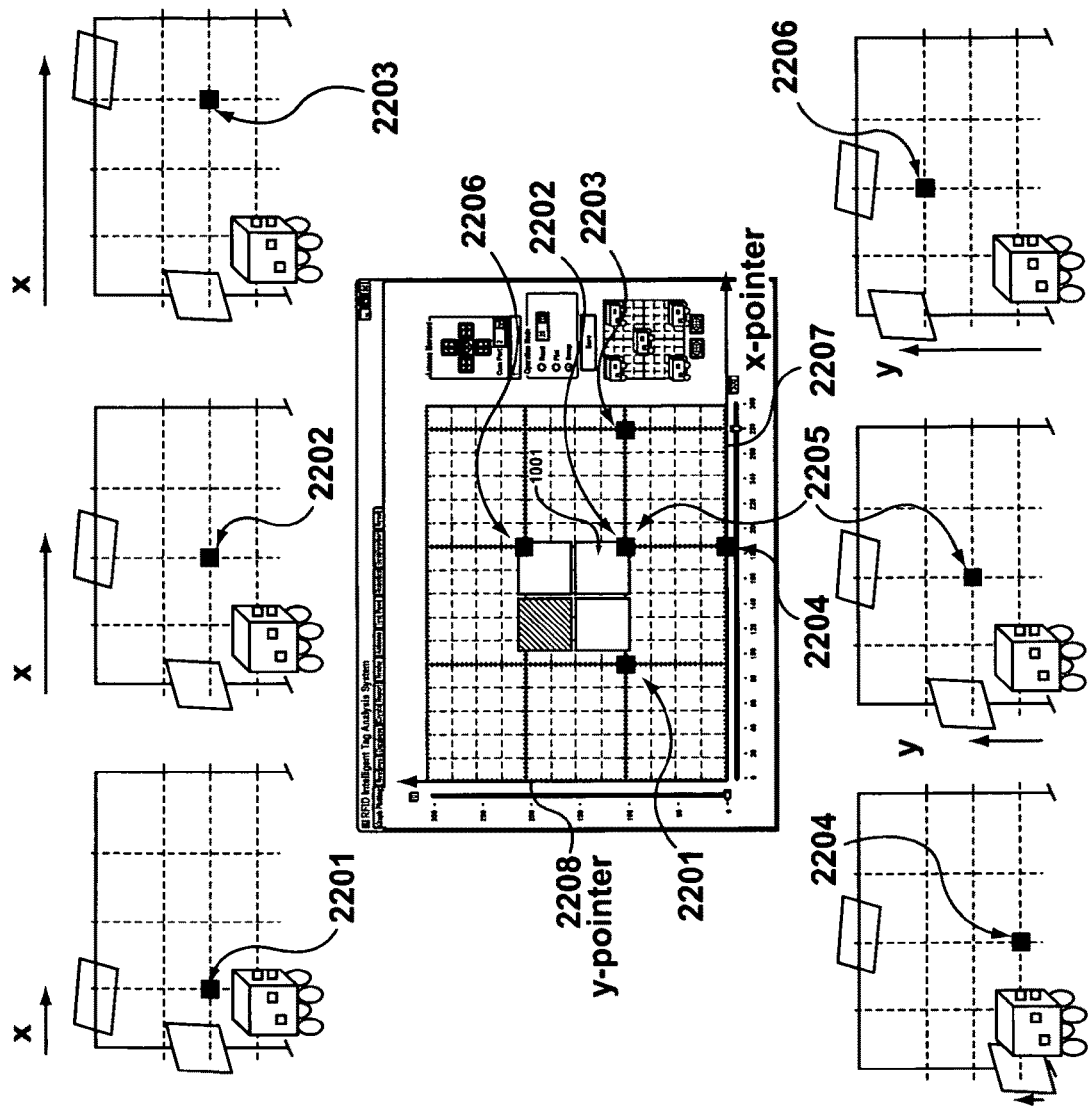
FIG. 22 comprises different x and y antenna positions for STP at a MOP Test Point to generate a scanning mesh.

As shown in FIG. 22, by representing antennas positions e.g. 2201, 2202, 2203, 2204, 2205, and 2206 on the graphical interface panel, the scanning mesh is clearly shown to end user. The position of antennas is the intersection point of 2207 x-pointer and 2008 y-pointer drawn by the software located at lower part and left hand side of the graphical user interface. The instant RSSI of each tag on the MOP is indicated by the central color boxes.

Figure 23:
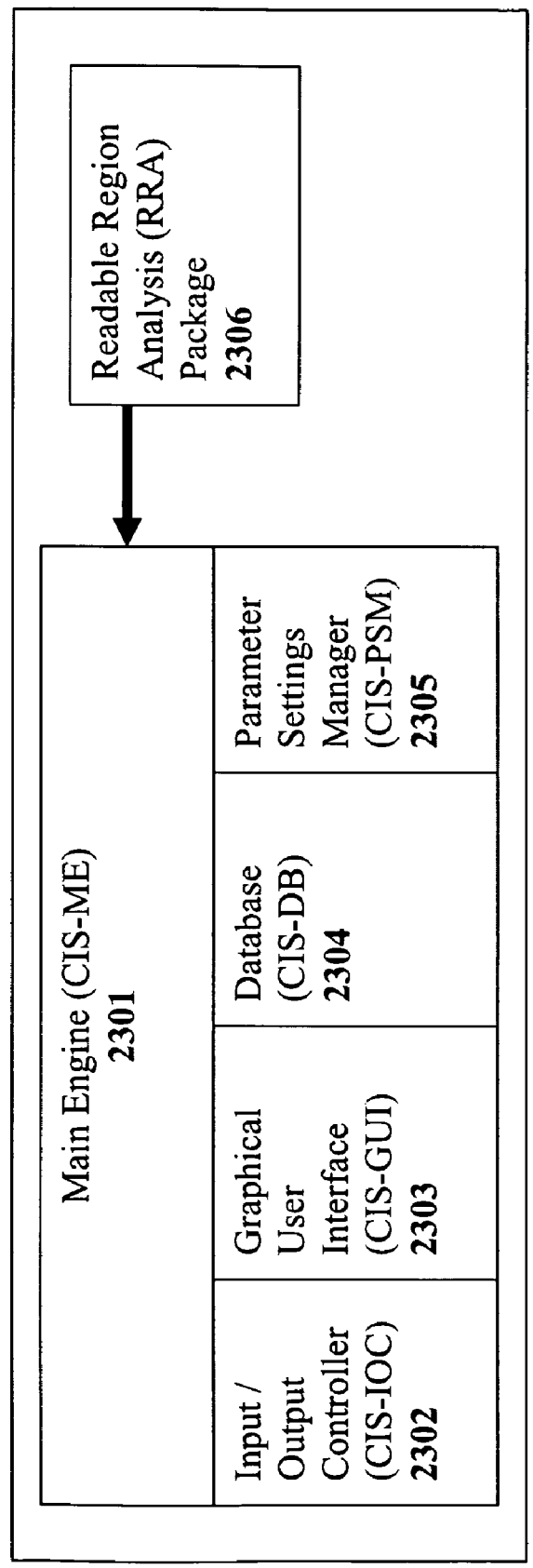
FIG. 23 is a schematic representation showing the components of the relationship of the Computer Integrated System (CIS) and their relationship with and RRA package.

As shown in FIG. 23, Main Engine 2301 is the main CIS component interacting with the Readable Region Analysis (RRA) Package 2306. After receiving commands from the RRA package, the Main Engine carries them out through the other CIS components: CIS-IOC 2302, CIS-GUI 2303, CIS-DB 2304 and CIS-PSM 2305. The CIS-IOC 2302 is responsible for controlling the positions of antennas and MOB. CIS-GUI 2303 provides users with the graphical user interfaces of the system. CIS-DB 2304 incorporates a database engine supporting all required data queries and updates. CIS-PSM 2305 is responsible for managing the parameters of all concerned RFID devices and motors.

The foregoing description of the invention has been presented for purposes of illustration and description. It is not intended to be exhaustive or to limit the invention to the precise embodiments disclosed. For example, the method, system, and apparatus described above for constructing a NBN is scalable.

This invention, for example, can be implemented in a network of routers including processor, an I/O bus, system memories, a CPU bus, and interface slots to connect to a variety of I/O devices, including storage devices, such as a removal disk drive.

When implemented in software, the elements of the present invention are essentially the code segments to perform the necessary tasks. The program or code segments can be stored in a processor readable medium or transmitted by a computer data signal embodied in a carrier wave over a transmission medium. The "processor readable medium" may include any medium that can store or transfer information. Examples of the processor readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

Those skilled in the art will readily observe that numerous modifications and alterations of the device may be made without departing from the scope, spirit or teachings of the invention. The invention is defined by the following claims and their equivalents:

What we claim is:

1. A support framework for automatically placing a Radio-Frequency Identification (RFID) antenna, comprising:
    a support structure to support the RFID antenna;
    a controller to control a movement of the RFID antenna on the support framework; and
    a mobile platform comprising a moveable object platform to carry a passive RFID tag to move around a predefined area along Test Points, wherein the passive RFID tag receives and transmits radio frequency (RF) signals from and to the RFID antenna, and wherein a computer system conducts analysis to feedback to the controller to adjust the RFID antenna.

2. The support framework of claim 1, wherein the support structure comprises multiple poles.

3. The support framework of claim 2, wherein the controller is driven by a stepper motor and clamped to at least one of the multiple poles.

4. The support framework of claim 1, wherein the mobile platform comprises a plurality of wheels for moving in a horizontal plane.

5. The support framework of claim 1, wherein the computer system further comprises a process unit, a database, and an analysis package.

6. The support framework of claim 1, wherein the analysis package determines a readable region for the passive RFID tag.

7. The support framework of claim 6, wherein the readable region is determined by assessing the passive RFID tag, the RFID antenna, and the Test Points.

* * * * *